(12) United States Patent
Hobbs

(10) Patent No.: US 7,411,371 B2
(45) Date of Patent: *Aug. 12, 2008

(54) BATTERY CHARGER AND METHOD OF CHARGING A BATTERY

(75) Inventor: Raymond Hobbs, Avondale, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 414 days.

This patent is subject to a terminal disclaimer.

(21) Appl. No.: 11/162,107

(22) Filed: Aug. 29, 2005

(65) Prior Publication Data

US 2006/0028178 A1 Feb. 9, 2006

Related U.S. Application Data

(63) Continuation-in-part of application No. 10/603,879, filed on Jun. 24, 2003, now Pat. No. 6,963,186.

(60) Provisional application No. 60/450,947, filed on Feb. 28, 2003.

(51) Int. Cl.
*H01M 10/46* (2006.01)

(52) U.S. Cl. .................................... 320/128

(58) Field of Classification Search ............... 320/107, 320/128, 140, 157, 159, 162, 164
See application file for complete search history.

(56) References Cited

U.S. PATENT DOCUMENTS 5,371,454 A 12/1994 Marek
6,963,186 B2 * 11/2005 Hobbs ...................... 320/128

* cited by examiner

*Primary Examiner*—Edward Tso
(74) *Attorney, Agent, or Firm*—Snell & Wilmer L.L.P.

(57) ABSTRACT

Stationary and on-board battery chargers, methods of charging batteries, electric-vehicle chargers, and vehicles with chargers, including electric vehicles and hybrid electric vehicles. Chargers may automatically charge at the correct battery voltage for various types of batteries. Chargers have variable AC power supplies controlled by digital controllers, isolation transformers, and rectifiers. Transformers may be foil-type, and may have copper foil. Power supplies may be variable-frequency generators and the controllers may control the frequency. Use of the variable frequency generator supply facilitates reduced component size and weight and better battery charging performance. Electric vehicle chargers may have card readers, and vehicles may have batteries and a charger. Methods of charging include identifying the battery type and gradually increasing the charging at different rates of increase while monitoring charging voltage, charging current, or both, until a current lid is reached. Charging may occur at constant current and then at constant voltage.

25 Claims, 3 Drawing Sheets

FIG. 1

BATTERY CHARGER AND METHOD OF CHARGING A BATTERY

CROSS-REFERENCE TO RELATED APPLICATIONS

This application is a continuation-in-part of, and claims priority to, U.S. patent application Ser. No. 10/603,879 filed Jun. 24, 2003, which itself claims priority to U.S. Provisional Patent Application Ser. No. 60/450,947 filed Feb. 28, 2003, of which the entire contents of both applications are hereby incorporated by reference.

FIELD OF INVENTION

This invention relates generally to systems and methods for charging batteries and vehicles with on-board charging systems.

BACKGROUND OF INVENTION

Rechargeable batteries have been used for electrical energy storage in a wide range of applications including their use in vehicles, power tools, lap-top computers, mobile phones, two-way radios, lights, and uninterruptible power supplies. Vehicles that use rechargeable batteries include automobiles, boats, and aircraft that have batteries for starting the vehicle, electric vehicles including golf carts, and hybrid electric vehicles. Hybrid electric vehicles typically have both batteries and another source of power, such as an internal combustion engine and a generator, a fuel cell, or photovoltaics.

Electric chargers and methods of charging have been developed and used for charging batteries, including batteries in electric vehicles. Chargers have been used in stationary applications, and have also been installed on vehicles to charge batteries located on the vehicles. Stationary chargers that use power from the electric power grid have also been widely used. Chargers located on vehicles may also be configured to plug into the electric power grid, or may obtain power from an on-board source of power, such as an internal combustion engine, or from a motor/generator used for regenerative braking as the vehicle decelerates.

In the case of stationary applications, chargers have typically been designed to charge one particular type of battery. However, batteries are currently being used of various types, each typically requiring its own voltage, current, and the like for optimal charging. Chargers have been invented that can charge more than one type of battery, wherein the user can manually select the type of battery to be charged. However, this requires a user to select the correct type of battery, and there is a risk that the user may inadvertently select the wrong type. This could result in a failure to charge the battery and could damage either the battery or the charger. Thus, a need exists for a charger that can automatically identify the type of battery that it is connected to and charge the battery in a safe, efficient, and convenient manner.

In addition, in the past, chargers have typically been relatively slow. Many chargers have been designed to charge a battery slowly to avoid charging it too quickly or overcharging it. But in many applications, this results in the battery, or electric vehicle, for example, being out of operation for a long time while it is being charged. In many applications, a need exists for a charger that can charge a battery at or near the optimum or maximum rate at which the battery can be safely charged. Also, a need exists for a method for charging batteries that can be used reliably to charge batteries at or near the optimal or maximum rate. In the specific application of electric vehicles, a need exists for a charger that will quickly charge an electric vehicle while the operator waits, similar in experience to fueling a fossil-fuel powered vehicle.

Furthermore, in the past, many chargers have been bulky and heavy, and a need exists to reduce their size, mass, or both. For instance, chargers have been developed that use alternating current, and transform the alternating current from one voltage to another using one or more wire-wound transformers. The transformer or transformers typically form a substantial portion of the size and mass of such chargers. Large transformers for 60-cycle operation were typically used. Thus, a need exists to reduce the size and mass of chargers, and specifically the size and mass of transformers used in chargers. This need exists for stationary transformers, but may be even more important in vehicles where the charger must be carried around on board the vehicle.

Even further, a need exists for battery chargers, including electrical vehicle and hybrid electric vehicle chargers, and methods of charging batteries, that fulfill a plurality or all of these needs, are capable of quickly charging most types of batteries used in the particular application, are easy and safe to use, and inexpensive to manufacture and maintain. Other needs exist that are apparent from this document.

SUMMARY OF INVENTION

One object of the present invention is to provide a charger that can automatically identify the type of battery that it is connected to and charge the battery in a safe, efficient, and convenient manner. Another object is to provide a method for charging batteries that can be used reliably to charge batteries at or near the optimal or maximum rate. In the specific application of electric and hybrid electric vehicles, an object of the present invention is to provide a charger that will quickly and conveniently charge such vehicles while the operator waits, similar to refueling a fossil-fuel powered vehicle. Further objects include to provide a charger of reduced size, mass, or both, that is inexpensive, reliable, and able to charge most or all types of batteries at a rate near optimal. Thus, it is an object of the present invention to reduce the size and mass of chargers, and specifically the size and mass of transformers used in chargers, for both stationary applications and applications on-board vehicles. Other objects of the present invention include providing chargers that are easy and safe to use, and inexpensive to maintain.

Still other objects of the present invention are to provide vehicles, including electric vehicles and hybrid electric vehicles that include chargers in accordance with the present invention that at least partially fulfill at least some of these objectives.

In at least partial fulfillment of at least some of these and other objects and needs, the present invention provides a battery charger for various purposes, and an electric-vehicle charger specifically for charging electric vehicles. In some embodiments, the charger may be stationary, and may be powered from an electric utility power grid, while in other embodiments, the charger may be located on a vehicle. In some embodiments, the charger may be configured to charge at a plurality of direct-current output voltages, and may be configured to automatically determine the voltage of the battery being charged and supply the correct output voltage. The capacity of the charger may, for example, be such that the charger is configured to charge in the range of about 30 amps to about 300 amps, with a voltage in the range of about 12 volts to about 700 volts, or both.

The charger may include a variable alternating-current power supply configured to output a first alternating current of a controllable power level. The power supply may be configured to input electrical power (e.g., from the power grid), and may include a rectifier or other switching device, for example, to convert input AC power to DC. In some embodiments, the power supply may be a variable-frequency generator, and may output a first alternating current of a controllable frequency. The variable-frequency generator may be configured so that the first alternating current has a substantially higher frequency than that of the input electrical power.

The charger may also include a digital controller configured to control the power supply, and this control may include control of the power level of the first alternating current output. In embodiments where the power supply is a variable-frequency generator, the digital controller may be configured to control the frequency of the first alternating current. The charger or controller may be configured to measure the voltage, current, or both of the direct-current output, and may use these measurements to make various control decisions. The controller may also be configured to enable an indication, for example, to alert the user when the battery is substantially charged.

The charger may also have a first transformer configured to change the voltage of the first alternating current to a second alternating current, and this first transformer may be a foil-type transformer, for example, with copper foil. The first transformer may, for example, be configured so that the second alternating current has a lower voltage and a higher amperage than the first alternating current. The charger may also have a rectifier or other switching device configured to convert the second alternating current to a direct current. Some embodiments may also have a filter configured to filter the direct-current output, which may include an inductor, a capacitor, or a plurality of such devices.

In some embodiments, the charger may also include a second transformer configured to supply power to the controller, and this second transformer may also be a foil-type. In addition, in some embodiments, the charger may be configured to communicate with a digital diagnostic device, for instance, configured to facilitate maintenance of the battery charger or to diagnose faults.

Some embodiments of the charger may include a card reader configured to enable the charger, and electric-vehicle chargers may also have a multi-pin connector configured to connect to an electric vehicle and deliver the direct-current output to the vehicle.

The present invention also provides a vehicle having a charger in accordance with the present invention. The vehicle generally has one or more batteries located on board. In some embodiments, the electrical power for charging the batteries may be supplied from a substantially-constant voltage source external to the vehicle, for example, through a cord and a connector. This voltage source may be, for example, the power grid. In some embodiments, the batteries may be charged from a power source located on the vehicle. In such embodiments, the vehicle may include a first electrical generator configured to output electrical power. The vehicle may also include an internal combustion engine, which may be configured to drive the first electrical generator. Alternatively, or in addition, the electrical generator may be configured to recover energy from the braking of the vehicle, may function as a motor configured to drive the vehicle, or a combination of these.

The present invention even further provides a method of charging at least one battery that may include at least the steps of measuring the substantially open-circuit voltage, and then, using the substantially open-circuit voltage, selecting a first power level for charging. The method may also include starting to charge the battery at the first power level, and measuring the charging voltage and the charging current. The charging power level may be increased until either a current lid or a voltage lid is exceeded. Where a voltage lid is involved, it may be based on the open-circuit voltage, and may be adjusted based on the temperature of the battery, for example. Constant voltage charging may occur, which may be substantially at the voltage lid.

In some embodiments, increasing the charging power level may involve a first rate of increase and a second rate of increase. The first rate of increase may occur before the second rate of increase, and the first rate may be greater than the second. The change from the first rate of increase to the second rate of increase may be triggered by a substantial cessation of increasing of the charging voltage, or by the charging current exceeding a minimum value. In some embodiments, the step of increasing the charging power level may include increasing a frequency, for example, of a variable-frequency generator. The power level and the frequency may be increased. The variable-frequency generator may have an alternating current output, which may be transformed with a foil-type transformer.

The method of the present invention may also include charging a battery until a current threshold is reached, which may be at a substantially constant voltage. The charging may be stopped when the current reaches the current threshold. The method may also involve charging at a substantially constant current until the voltage lid is exceeded.

In some embodiments, there may be a precursory step of partially charging the battery, for example where the battery was overly discharged. In addition some embodiments of the method of the present invention may include terminating the charging function (or step), and verifying the open-circuit voltage. Alternatively, the substantially open-circuit voltage may be used to estimate a charging current at a particular power level, and the charging current may be verified to be within acceptable parameters at that particular power level. These steps may be taken to verify that the correct type of battery has been identified or that the identified battery is performing according to acceptable specifications for the programmed algorithm. If a battery is not performing as expected, the charger will recognize this and modify or terminate the charging algorithm to protect the battery system, vehicle and charging equipment. Various embodiments of chargers, vehicles, and methods in accordance with the present invention may have various combinations of these and other features.

BRIEF DESCRIPTION OF THE DRAWINGS

The figures in this document illustrate various exemplary embodiments of the present invention. Embodiments of the present invention may include part or all of the features shown in one of these drawings, or may include features from two or more figures. Embodiments of the present invention may also include features described in the specification, or limitations to features described in the specification. Furthermore, embodiments of the present invention may include features that would be familiar to a person of ordinary skill in the art having studied this document.

DETAILED DESCRIPTION

In general, various embodiments of the present invention include stationary, mobile, and on-board battery chargers, methods of charging batteries, electric-vehicle chargers, and vehicles with chargers, including electric vehicles and hybrid electric vehicles. Chargers in accordance with the present invention may automatically charge at the correct battery voltage for various types of batteries. Chargers in accordance with the present invention generally have variable AC power supplies that are controlled by digital controllers. Chargers generally also have isolation transformers which may change voltage and current, and rectifiers or other switching devices to convert alternating current to direct current. In some embodiments of the present invention, transformers may be foil-type, and may have copper foil, while in other embodiments, transformers may be a wire wound type. Foil transformers may reduce the size and weight (mass) of the charger. Power supplies may be variable-frequency generators and the controllers may control the frequency of the output of the power supplies.

Electric vehicle chargers may have card readers, which may, for example, be credit card compatible, for billing credit cards. Further, vehicles in accordance with the present invention (e.g., hybrid electric vehicles) may have a generator or motor/generator driven by an internal combustion engine or configured to recover braking energy. One or more electric motors or motor/generators may also drive the vehicle. Vehicles in accordance with the present invention generally also have batteries and a charger.

Methods of charging generally may include identifying the battery type and gradually increasing the charging at different rates while monitoring the charging voltage, the charging current, or both, until a current lid is reached. Two rates of increasing the power level may be used.

Figure 1:
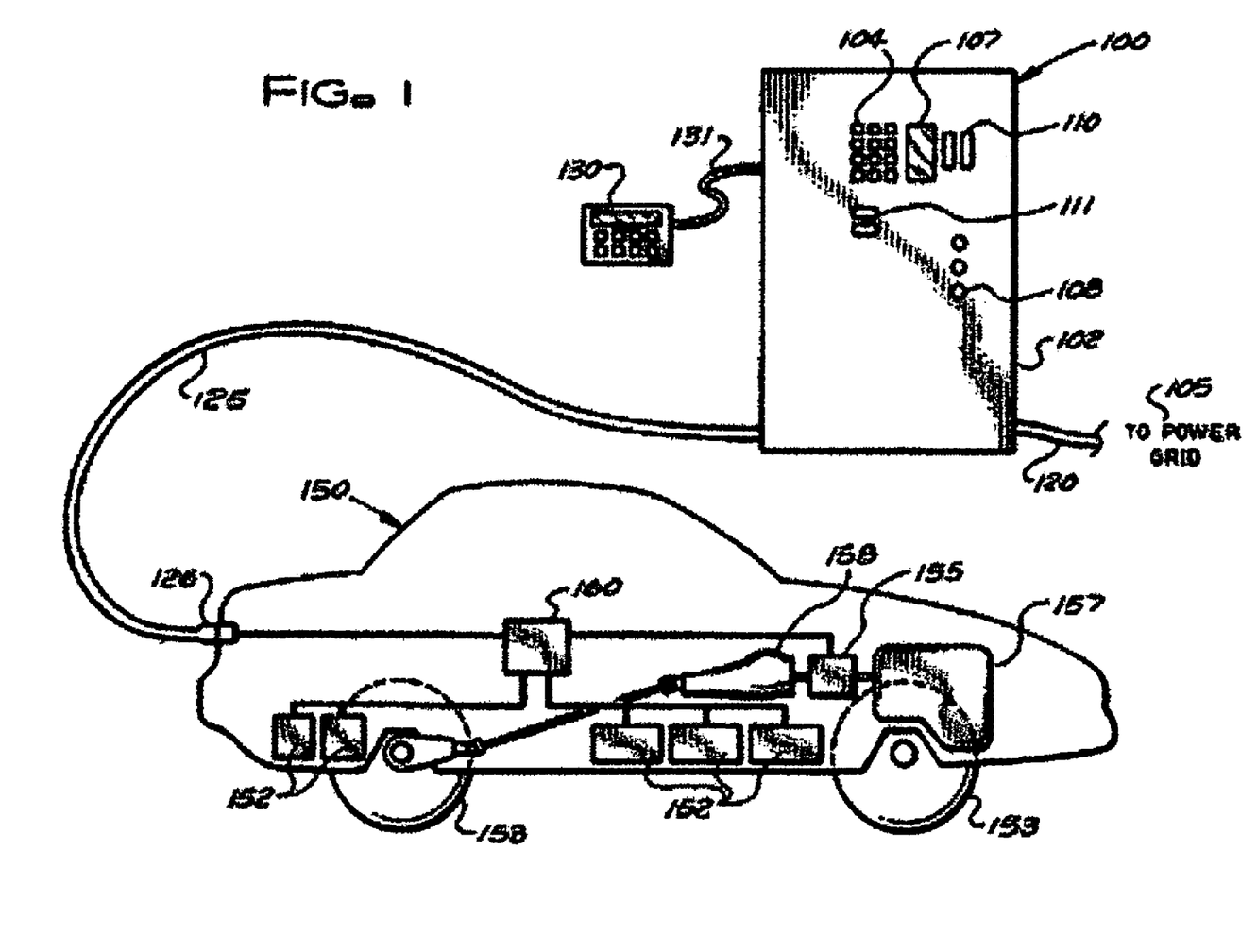
FIG. 1 is a front view of a charger in accordance with the present invention connected to a vehicle.

FIG. 1 illustrates an exemplary embodiment of a charger in accordance with the present invention. Charger 100 is connected to an exemplary embodiment of a vehicle 150. Charger 100 may be an electric-vehicle charger, meaning that it may be configured to charge batteries (e.g., batteries 152) that are located on electric or hybrid electric vehicles (e.g., vehicle 150) which are used, at least in part, to power at least one electric motor to move the vehicle. In other embodiments, however, charger 100 may be used to charge batteries used for other purposes, including those purposes identified herein.

Thus, although charger 100 is shown charging vehicle 150, chargers in accordance with the present invention may be used for stationary battery charging in energy storage (such as load shifting, or brown out/blackout ride through or other "non-floating" charge applications), portable electric energy equipment, and distributed or renewable electrical energy battery applications such as, solar, wind, tidal or wave, and geothermal primary energy sources.

In the exemplary embodiment illustrated, charger 100 is configured to charge electric vehicles including hybrid electric vehicles, and is connected to the power grid 105 via cable 120, and to vehicle 150 via cable 125 and plug or connector 126. Cable 120 may be a multi-conductor insulated cable suitable for the application, and may carry, for example, single-phase or three-phase alternating current of 50 or 60 Hz, and may be a standard voltage. Cable 125 may also be a multi-conductor insulated cable suitable for the application, and may carry, for example, direct current of a voltage and current suitable for charging the battery pack or batteries 152 of vehicle 150. In an exemplary embodiment, charger 100 may be configured to provide a charging current in the range of about 30 amps to about 300 amps DC, and a charging voltage in the range of about 12 volts to about 700 volts DC.

In an exemplary embodiment, charger 100 may include a multi-pin connector 126 configured to connect to an electric vehicle 150 and deliver the direct-current output (e.g., direct current 293 described below) to the vehicle 150. Thus, connector 126 may be a vehicle connector, for example, a nine pin connector, and may have two large main conductors, a ground (also large), and, for example, six smaller conductors available for control purposes (control pins). Cable 125 may have corresponding individually-insulated conductors. Connector 126 may be, for example, a Society of Automotive Engineers (SAE) J1772 connector design, e.g., as manufactured by ITT CANNON or AVCON. In an exemplary embodiment, the allocation of the 9 pins may be as follows: (−) battery negative; (G) GROUND; (+) battery positive; (1) vehicle power supply (e.g., 240, 110, or 24 volt AC); (2) vehicle power return (e.g., 110 volt or DC); (3) safety pilot supply; (4) safety pilot return; (5) analog or digital circuit; and (6) analog or digital circuit. The analog or digital circuits may provide, for example, information on the type or voltage of the battery (e.g., battery, battery pack, or batteries 152), battery temperature (e.g., during charging), communication from an on-board battery management system, etc.

Charger 100 may deliver electricity for many different battery chemistries or classifications in many different types of arrangements or groups of individual battery cells (collectively, types of batteries, as used herein), within a range. In one embodiment, this normal battery pack voltage range may be, for example, in the range of about 36 volts to about 700 volts. In other embodiments, the lower voltage limit may be 12 volts or 24 volts, for instance. Battery or batteries 152 may be, for example, lead-acid batteries including flooded or valve regulated (VRLA) types, nickel-based batteries, or lithium-based batteries. Batteries 152 or individual cells thereof may be wired or arranged in series, in parallel, or in some combination thereof, and may form battery packs.

Charger 100 may be configured to charge in partial "fast or opportunity" charging or full charging modes. Hence, in the fast or opportunity charging mode, charger 100's refueling ability for battery-powered electric vehicles 150 may be equated to a gasoline pump at a service station, which may be capable of refueling a wide range of fuel-powered vehicles regardless of make or horsepower rating. In some embodiments, charger 100 may be configured to dispense motor vehicle fuels as well as charge batteries (e.g., electric vehicles) or charger 100 may be part of a motor fuel dispenser or motor fuel service station. In embodiments where fuels are dispensed in close proximity to where charging is being performed, for example, charging batteries while refueling hybrid vehicles, care must be taken to avoid possible ignition of fuel vapors, for example, from static or other electric discharge.

Figure 2:
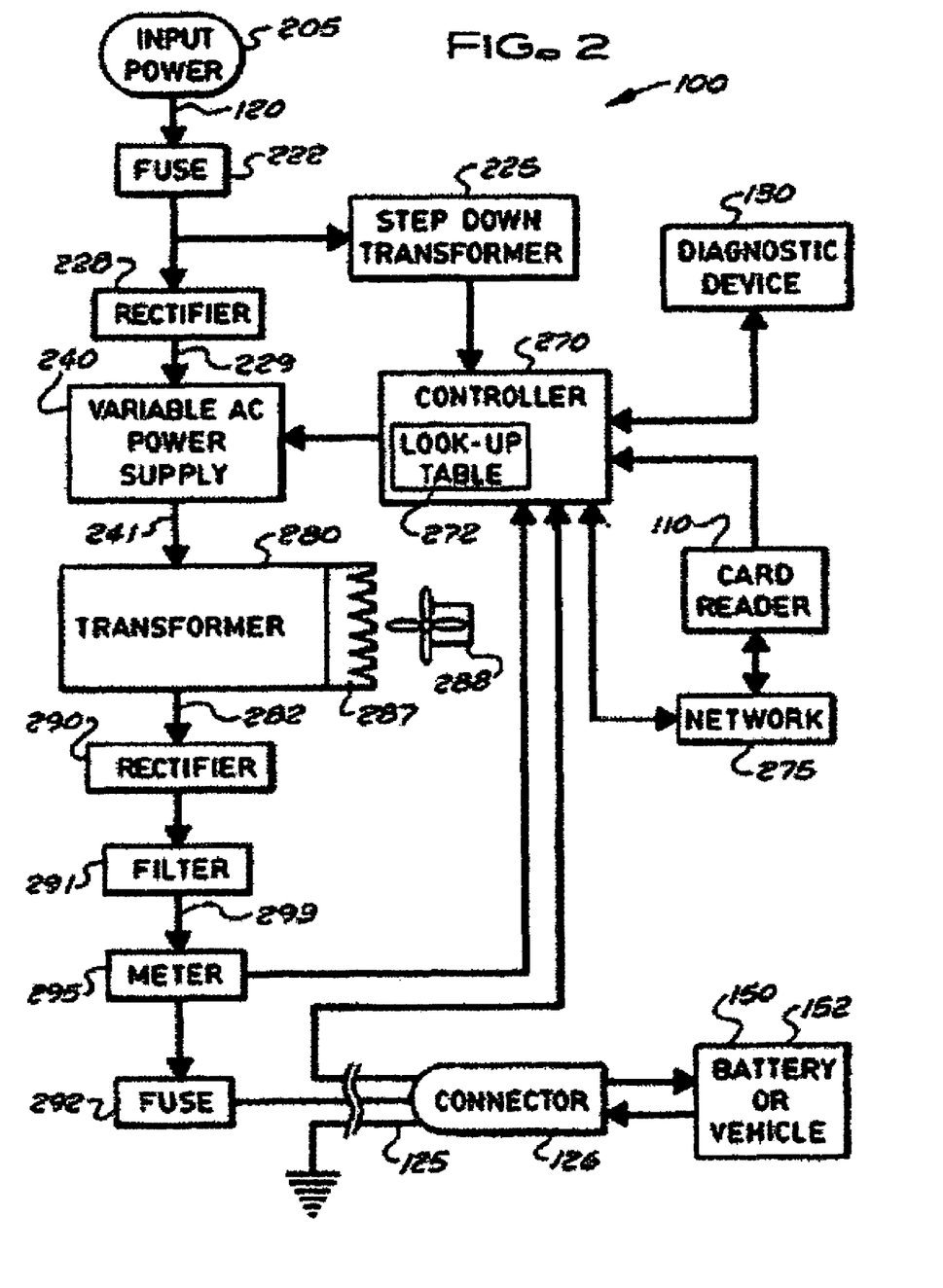
FIG. 2 is a block diagram illustrating various components of on embodiment of a charger in accordance with the present invention.

FIG. 1 illustrates the exterior of charger 100, which includes in the exemplary embodiment illustrated, enclosure 102, key pad 104, screen 107, card reader 110, and printer 111. Other embodiments of charger 100 may not require control devices or buttons on its exterior. Enclosure 102 may be an electrical enclosure of a type suitable for the environment in which charger 100 is located. An exemplary embodiment of the contents of enclosure 102 is shown in FIG. 2 and described below with reference thereto.

Still referring to FIG. 1, a user may activate or enable charger 100 by swiping a card through card reader 110, which may be a credit card, debit card, access card, user identification card, vehicle identification card, or the like. Charger 100 may provide instructions or prompt the user for information via writing on screen 107, and the user may input information via key pad 104. Such information may include, for example, a personal identification number (PIN) for a debit card, an access code, whether the User wants a receipt, whether the user wants to purchase a car wash, etc. A receipt may be printed by printer 111. Charger 100 may also have one or more indicator lights 108, which may indicate, for example, when charging is complete or if there is a fault detected in the charger or the battery. In addition of or in lieu of indicator lights 108, charger 100 may have one or more gauges. These gauges or screen 107 may indicate the charging rate, the amount of time estimated to complete the charge, the bill for the fuel purchased, or other information that may be of use to the user. In some embodiments, Light emitting diode (LED) or liquid crystal displays (LCD) on the front of the charger 100 (e.g., on enclosure 102) may provide some or all of the functions of screen 107 or indicator lights 108. These functions may include indicating that the battery is connected, that the charging sequence is initiated, the charge rate, that the charge is complete, that there is a battery, charging equipment or utility supply fault, or some combination of these indications. Basic maintenance diagnostics and trouble shooting for the charger 100 may also be displayed.

Also illustrated in FIG. 1 is diagnostic device 130, which may be configured to communicate with charger 100. Diagnostic device 130 may be connectable to charger 100, for example, via cord 131, or may communicate with charger 100 by another means, for example, via cellular telephony, infrared serial link, or wireless local area network. Diagnostic device 130 may be hand held, may have a key pad and screen as shown, and may be configured to diagnose faults within charger 100, program charger 100, provide additional charging information, etc. Diagnostic device 130 may be a personal digital assistant (PDA), and may be configured to be used by a technician having more knowledge than a typical user of charger 100. Diagnostic device 130 may also (or instead) allow manual control of battery charging, or programming of charger 100. In some embodiments of charger 100, manual control may be necessary or advantageous for charging a battery that has been overly discharged, for example. Thus, charger 100 may be configured to communicate with digital diagnostic device 130 configured to facilitate maintenance of the battery charger or diagnosis of faults. There may be two separate accessory devices that provide diagnostics and manual control, or these features may be provided by charger 100, for example via screen 107 and key pad 104.

Turning now from the stationary charger 100 to the vehicle 150, in the exemplary embodiment illustrated in FIG. 1, vehicle 150 is a car, but in other embodiments, vehicle 150 may be another type of vehicle such as an industrial cart, golf cart, all terrain vehicle or personnel carrier such as used in airports or at resorts, an electric boat, an industrial or commercial vehicle or piece of equipment, a CFR 49 DOT defined vehicle, a wheel chair, a personal transportation device, a two or three wheeled motorcycle or scooter, or a SEGWAY, human transporter. Vehicle 150 may have batteries 152, which in some embodiments of vehicle 150 may be charged periodically with stationary charger 100. In other embodiments of vehicle 150, there may be an on-board charger 160 in accordance with the present invention. Charger 160 may be used in lieu of charger 100, and may input electrical power from an external source, such as power grid 105, for example, via cord 120 or 125 and connector 126, or similar such components. In such embodiments, the electrical power input by charger 160 may be supplied from a substantially-constant voltage source external to vehicle 150, for example, through cord 120 or 125, and connector, for example, connector 126. Charger 160 is an electric-vehicle charger, as that phrase is used herein, and power grid 105 is a substantially-constant voltage source as that phrase is used herein.

In some embodiments, chargers in accordance with the present invention may be used for batteries that are used primarily just for starting motors or other equipment. For example, charger 100 may be used for battery maintenance, auxiliary battery maintenance, or both, for example, in internal combustion engine vehicles, hybrid electric vehicles, turbine powered equipment, marine equipment, or aerospace vehicles. Battery maintenance may be performed using diagnostic device 130.

Chargers in accordance with the present invention, including charger 100, may also be used as a variable power source to produce DC electricity from conventional grid power in various other commercial or industrial applications, including welding equipment, impressed current for cathodic protection, production of hydrogen, oxygen, or both from water in electrolyzers or electrolysis equipment, operating DC motors, providing power for DC signals, providing power for computers or semiconductor devices, etc. In the example of electrolysis, for example, for production of hydrogen, charger 100 may be used as a source of DC power for production of hydrogen at night (off peak) when utility power is plentiful. In one embodiment, the same charger 100 may be used for opportunity charging (as needed) during the day time (on-peak) and for electrolysis of hydrogen at night (off-peak).

Turning now to FIG. 2, charger 100 may be connected to and powered by input power 205, which may be power grid 105 illustrated in FIG. 1. Input power 205 may be delivered by cable 120. Input power 205 may be grounded, and may be, for example, alternating current (AC) power at 60 or 50 Hz, 3 phase, for instance, 208 or 480 volt; AC power 60 or 50 hertz, for instance, 200 to 240 volt single phase; or direct current (DC), for instance, a range between approximately 270 volts to approximately 360 volts DC or a range between approximately power. These ranges are software selectable and dependent on the native grid infrastructure where the input power is generated. Thus, Charger 100 may be adapted or reconfigured to a variety of power sources or delivery modes dependent on where the unit is located.

Some embodiments of charger 100 may be configured to work with a variety of types of input power 205. In such embodiments, the performance of charger 100 may vary depending on the input power 205 supplied. For example, single phase input power 205 may result in a lower peak output power (e.g., direct current 293 described below) as compared to three-phase input power 205. Single-phase power may typically be found in residential or light commercial environments. In many installations, single-phase power may be limited to 240 volt nominal and a maximum of 48 ampere (80% of 60 ampere circuit breaker), and the maximum power DC output (e.g., direct current 293) may be limited to about 55 amps when charging a 96 volt battery. Thus, the power output may be reduced to about 6 KW from 10 KW when going from 208 volt three phase to 240 volt single phase.

Three-phase electricity is commonly available in North America at 208 volt and 480 volt. European electricity is commonly available at 230 volt three phase. In some embodiments, charger 100 may be configured to accommodate some combination of these numbers of phases and voltages, and both 50 and 60 Hz supply frequency. The controller 270 (described below) may sense supply power (input power 205) as single or three phases by monitoring the power input terminal points. The Charger 100 or controller 270 may adjust internal functions and output power (direct current 293) based upon whether input power 205 is single or three phase power.

Focusing now on the various components of a charger in accordance with the present invention, for example, the contents of enclosure 102, FIG. 2 illustrates an exemplary embodiment of the components of stationary charger 100. The components of on-board charger 160 may be similar except as would be apparent to a person of skill in the art. Input power 205 may be delivered through a circuit breaker, fuse block, or fuse 222, which may be provided for circuit protection. In embodiments where input power 205 is AC, charger 100 may include rectifier 228, which converts input power 205 to direct current 229. In embodiments where input power 205 may be either AC or DC, rectifier 228 may be bypassed when input power 205 is DC. For instance, DC input power 205 may be connected to the rectifier 228 output bus or to the input to power supply 240. Embodiments of the present invention configured to use only DC input power 205 may omit rectifier 228.

As just mentioned, Charger 100 generally also includes a variable power supply 240, which generally outputs alternating current 241, which may be referred to herein as the first alternating current. Power supply 240 may be a variable alternating-current power supply configured to output a first alternating current of a controllable voltage or power level. Rectifier 228 may be part of power supply 240. Thus, power supply 240 may comprise rectifier 228. Power supply 240 generally has a variable voltage or power output, and may have a variable frequency output as well. In other words, the voltage or power level of alternating current 241 may vary, and in some embodiments, the frequency of alternating current 241 may also vary. In some embodiments, power supply 240 may be a variable-frequency or variable-speed drive or generator which, for instance, may be suitable for driving an AC motor over a range of speeds. Thus, power supply 240 may be a variable-frequency generator configured to input electrical power (e.g., input power 205) and output a first alternating current 241 of a controllable frequency wherein the output voltage and frequency may have a defined and piecewise proportional relationship to each other. In such embodiments, power supply 240 may be configured to provide more power (voltage, current, or both) at higher speeds (frequencies).

Power supply 240 may be either a constant voltage source, or a constant current source, or may produce power (alternating current 241) at a current and voltage that are generally inversely related at a constant power setting. The power output (alternating current 241) of power supply 240 may remain relatively constant over a range of voltages, or may vary with voltage, but generally will not vary as much as that of a constant current source. Similarly, the power output (alternating current 241) of power supply 240 may remain relatively constant over a range of currents, or may vary with current, but generally will not vary as much as that of a constant voltage source.

Power supply 240 may be a variable-frequency current device or generator which may be available commercially as a variable-speed motor drive. Power supply 240 may produce alternating current 241, which may be single or multi-phase power for example, three-phase, and may be substantially sinusoidal power. Power supply 240 may be configured so that first alternating current 241 has a substantially higher frequency than that of the input electrical power (e.g., input power 205). Alternating current 241 may have a frequency, for example, of 400 to 800 hertz. The switching or carrier frequency may vary from 4 kHz to 10 kHz. xyz The switching frequency may be held constant as output frequency is increased to change the charge voltage for the battery. Further, increases in output frequency may correlate with output current or power increases from power supply 240 (e.g., increases in alternating current 241). This may be the case, for example, for embodiments wherein power supply 240 is a variable-speed drive or variable-frequency generator. The size of power supply 240 may vary, for example, from 3 KW to 20 KW. In some embodiments, power supply 240 may produce even greater output power.

The switching or carrier frequency of power supply 240 may be substantially higher than the output frequency it generates. The switching or carrier frequency may be selected separately from the output frequency. The output frequency of power supply 240 may set the voltage and current gains of the output. Thus the device architecture may benefit from the presence of two distinct frequencies being generated, a output frequency and a switching or carrier frequency. The output frequency may be selected to maximize current and voltage control, while the carrier frequency may be selected to optimize the size and performance of components such as filter 291 without affecting the ripple reduction characteristics of filter 291. The carrier frequency may also be selected to optimize the size and performance of transformer 280, which may be a foil type or wire wound transformer.

Power supply 240 may be controlled by controller 270. Controller 270 may be a digital controller configured to control power supply 240, and the control that controller 270 has over power supply 240 may include (at least) control of the power level of the first alternating current 241. Thus, controller 270 may communicate with or control power supply 240 to control the power level of alternating current 241.

In some embodiments, controller 270 may control the frequency of alternating current 241. Thus, charger 100 may include a digital controller 270 configured to control the frequency of said first alternating current 241. This is the case, for example, in embodiments wherein power supply 240 is a variable-speed drive or variable-frequency generator. Thus, controller 270 may be a digital controller configured to control a variable-frequency generator (e.g., power supply 240), and the control may include at least control of the frequency of first alternating current 241. The power (voltage, current, or both) may also be controlled, and may vary with frequency, directly, generally, or otherwise.

Controller 270 may be a digital controller, and may include a circuit board with a processor and memory for data storage. Controller 270 may have, for example, 8 analog to digital channels, and 12-bit digital channel resolution. Controller 270 may comprise software configured to perform the functions described herein, including digital control, display and diagnostics. There may be a plug from controller 270 to charger 240, for example, a 24 pin plug. The memory of controller 270 may include one or more look-up tables, for example, look-up table 272. In other embodiments, charger 100 may utilize memory or look-up tables (e.g., 272) that are separate from controller 270.

Look-up table 272 may be used to store information on various types of batteries that may be charged by charger 100. Look-up table 272 may be part of a battery classifier or system configured to identify the type of battery pack or battery (e.g., 152) being charged, which may include, for example, the nominal or open-circuit voltage, the maximum or optimal charging voltage, the threshold current or current at which charging should be stopped, etc.

Controller 270 may be powered by input power 205, which may be reduced to a lower voltage via step down transformer 225. For instance, step down transformer 225 may take incoming AC power (e.g., input power 205) and step it down to 24 volts AC for control power. Step down transformer 225 may be connected to the rectifier 228 input of power supply 240. In some embodiments, step down transformer 225 may be a foil-type transformer, for example, of the general type described herein for transformer 280 (described below). Thus, in such embodiments, charger 100 may further comprise a foil-type second transformer 225 (in addition to transformer 280 described below) configured to supply power to controller 270. Using a foil-type transformer for step-down transformer 225 may reduce size, mass, or both. Thus, charger 100 may be lighter in weight and smaller than other fast chargers known in the art.

Controller 270 may interface or communicate with diagnostic device 130, card reader 110, or both. Controller 270 may be compatible with standard credit card commercial fuel systems (e.g., for petroleum). Hence charger 100 may be used to charge or refuel battery powered vehicles, such as low speed vehicles (for example, those vehicles in compliance with 49 CFR 571.500) at commercial establishments, for example, service stations, grocery stores, restaurants, golf courses, and the like.

Controller 270 may also communicate with the user, for example, via key pad 104, screen 107, or lights or gauges 108, all illustrated in FIG. 1 and described above with reference thereto. In other words, controller 270 may interface or communicate with these devices 104, 107, 108, or some combination thereof.

Controller 270, card reader 110, or both, may interface or communicate with network 275, which may be, for example, a credit card network or the Internet. Network 275 may obtain information from controller 270 or from card reader 110, or may provide information to these components. Network 275 may be used, for example, to authorize credit card purchases, remotely monitor the use of charger 100, program controller 270, provide data for look-up table 272, perform the functions of diagnostic device 130, etc.

Power supply 240 may be electrically connected to transformer 280, and transformer 280 may change the voltage of first alternating current 241 to a second alternating current 282. Thus, charger 100 may have a first transformer 280 configured to change the voltage of first alternating current 241 to a second alternating current 282. For instance, transformer 280 may reduce the voltage and increase the current of alternating current 241, producing alternating current 282. In other words, first transformer 280 may be configured so that second alternating current 282 has a lower voltage and a higher amperage than first alternating current 241. In another embodiment, transformer 280 may increase the voltage and reduce the current of alternating current 241, producing alternating current 282. In other words, first transformer 280 may be configured so that second alternating current 282 has a higher voltage and a lower amperage than first alternating current 241.

Transformer 280 may function as an isolation transformer, isolating alternating current 282 from alternating current 241. The isolation transformer may provide a level of safety by reducing the maximum voltage that may be produced at connector 126 with respect to ground.

Transformer 280 may generate some heat, as a result of the current that flows through it, and this heat may be dissipated via heat sink 287, fan 288, or both. Fan 288 may be driven by an electric motor and may be thermostatically controlled, for example, to cycle on and off as needed.

In various embodiments, transformer 280 may be, for example, a wire-wound dry transformer, or a foil-wound (a.k.a., foilwound) or foil-type transformer, which may be, for example, a high-frequency low-voltage differential isolation transformer. In an exemplary embodiment, transformer 280 performs a step-down function, for example, from 1000 volts (first alternating current 241) to 700 volts (second alternating current 282) (both nominal voltages RMS) at a maximum of 300 amps. Different battery pack or battery (e.g., battery 152) voltage (voltage of direct current 293 described below) could be accommodated based upon output voltage at the power supply (voltage of alternating current 241). The ratio of transformer 280 may determine the charging range.

In embodiments of charger 100 wherein transformer 280 is a wire-wound transformer, transformer 280 may be a copper-iron wire-wound type. Higher frequency operation may reduce the size of transformer 280, but may also increase the heat rise in the iron and copper windings. Changing operation frequency may increase the thermal efficiency and may minimize the thermal difference between the iron and copper. In embodiments of charger 100 wherein the frequency of alternating current 241 produced by power supply 240 varies, as controller 270 increases the output frequency of power supply 240 (of alternating current 241), the thermal characteristics of transformer 280 may change. Controller 270 may set the output frequency of power supply 240 (of alternating current 241), to minimize (or seek the best compromise between) transformer 280 heating and temperature differences between the iron and copper winding. To further reduce the impact of heating the copper winding, secondary wire size may be reduced, e.g., from a #5 wire to two #7 wires in the transformer (e.g., transformer 280).

In embodiments of charger 100 wherein transformer 280 is a foil-type transformer, transformer 280 may be a dry type foil isolation transformer, for example, designed for 60-cycle operation, or may be a high-frequency foil transformer of a type used in aerospace functions. Foil-type transformer 280 may have metal sheets or plates (foil) with sheets of insulation in-between, and may be wound or rolled into a spiral. The insulation may be, for example, polyester, fiberglass, or nomex, and may be impregnated with an epoxy resin. The metal plates may be aluminum or copper, for example. Aluminum foil-type transformers are generally lighter in weight, but copper foil-type transformers are generally smaller due to the higher electrical conductivity of copper. A foil-type transformer may have higher ambient operating temperature capability than a wire-wound transformer, and may have better electrical efficiency. In addition, a foil-type transformer 280 may have the safety advantage of low voltage steps (2-3 volts) between windings, and hence may have a substantial safety advantage over conventional transformers in the event of a short circuit between windings. Further, its high frequency foil design may result in about a 5:1 reduction in weight and also smaller physical size. Due to its smaller size, it may need to have a heat sink 287 to maintain thermal performance. Forced air cooling from fan 288 may also be required for a foil-type transformer 280. But higher efficiency and lower heat gain may result in using a foil-type transformer 280 rather than a wire-wound type, and higher operating frequencies (e.g., of alternating current 241) may be possible. It may be advantageous for controller 270 to control the frequency (e.g., of alternating current 241) to avoid heating problems with transformer 280.

Still referring to FIG. 2, second alternating current 282 may be converted to direct current 293 by rectifier 290, which may be filtered by filter 291. Thus, charger 100 may include rectifier 290, which may be configured to convert second alternating current 282 to direct current 293. Direct current 293 may be the output of charger 100 (e.g., to vehicle 150 or batteries 152). In an exemplary embodiment, charger 100 may be configured to provide a direct current 293 in the range of about 30 amps to about 300 amps, and voltage in the range of about 12 volts to about 700 volts DC.

In some embodiments, rectifier 290 may be integral with filter 291 in one component. Filter 291 may include an inductor, a capacitor, or both, or may include a plurality of capacitors and inductors. Filter 291 may reduce the DC "ripple" for high quality battery charging. Quality of the charge may be defined as the control over the charging voltage (e.g., of direct current 293) or lack of variation. The inductor may be either wire-wound or foil type inductor. Foil inductors may reduce the size and weight when compared to conventional copper wire-wound assemblies. The switching or carrier frequency of power supply 240 may be substantially higher than the output frequency it generates. The switching or carrier frequency may be selected separately from the output frequency. The output frequency of power supply 240 may set the voltage and current gains of the output. Thus the device architecture may benefit from the presence of two distinct frequencies being generated, a output frequency and a switching or carrier frequency. The output frequency may be selected to maximize current and voltage control, while the carrier frequency may be selected to optimize the size and performance of components such as filter 291 without affecting the ripple reduction characteristics of filter 291. The carrier frequency may also be selected to optimize the size and performance of transformer 280, which may be a foil type or wire wound transformer.

Meter 295 may measure the voltage, current, or both of direct current 293, and may communicate this information to controller 270. Voltage may be measured across a shunt to measure current. For safety to both people and equipment, direct current 293 may be limited in a short circuit by fuse 292. Direct current 293 may be delivered to one or more batteries. For instance, direct current 293 may be delivered through cord 125 and connector 126 to vehicle 150 and batteries 152. In other embodiments, direct current 293 may be delivered to other equipment (in lieu of vehicle 150 or battery 152), such as, for example, electrolysis equipment for the production of hydrogen.

Focusing for a moment on vehicles in accordance with the present invention, and referring to FIG. 1, vehicle 150 may be an electric vehicle, and may have batteries 152 as its only power source. But in other embodiments, vehicle 150 may be a hybrid electric vehicle (HEV), and may have another power source in addition to batteries 152, for example, engine 157. In such embodiments, charger 160 may be configured to input electrical power from an electrical generator located on vehicle 150, such as generator 155. Charger 160 may be configured to input electrical power just from generator 155, or from either generator 155 or from an external power source (e.g., via connector 126 and cord 125). In embodiments having a generator 155, generator 155 may, as an example, be connected to engine 157, and engine 157 may turn generator 155. Thus, engine 157 may be configured to drive electrical generator 155. Generator 155 may also function as a motor, and may be configured to drive vehicle 150, for example, through transmission 158, or to assist engine 157 in driving vehicle 150, or both. In other words, electrical generator 155 may also be a motor configured to drive the vehicle 150. Generator 155 may also act as a starter motor for engine 157.

Generator 155 may be configured to brake vehicle 150 when deceleration is demanded, and may deliver power from regenerative braking to charger 160 for storage in batteries 152. Thus, electrical generator 155 may be configured to recover energy (e.g., generate electricity) from the braking of vehicle 150. In other embodiments, generator 155 may be connected directly to or integral with wheels 153. In still other embodiments, generator 155 may be, for example, a fuel cell, or an array of photovoltaic cells, and may also apply to non-vehicle applications.

Vehicle 150 may comprise charger 160, which may comprise various components shown on FIG. 2. For instance, vehicle 150 or charger 160 may comprise a variable alternating-current power supply 240 configured to input electrical power (e.g., input power 205) and output a first alternating current 241 of a controllable power level. Vehicle 150 or charger 160 may also have a digital controller 270 configured to control power supply 240, and this control may include (at least) control of the power level of the first alternating current 241. In some embodiments of vehicle 150 or charger 160, power supply 240 may be a variable-frequency generator and digital controller 270 may be configured to control the frequency of the first alternating current 241. Vehicle 150 or charger 160 may also have a first transformer 280 configured to change the voltage of the first alternating current 241 to a second alternating current 282. Transformer 280 may be a foil-type transformer, for example as described herein. Vehicle 150 or charger 160 may even further include a rectifier 290 configured to convert second alternating current 282 to direct current 293.

In addition to various components shown in FIG. 2 or described in reference thereto, vehicle 150 may include other components, some of which are shown in FIG. 1. For instance, vehicle 150 may have at least one battery pack or battery 152, which may be configured to store the direct-current 293 output. Vehicle 150 may further comprise a first electrical generator configured to output the electrical power that is used by (input by) charger 160 or power supply 240. For example, vehicle 150 may include generator 155, which may generate input power 205 (input to charger 160). A second electrical generator or motor/generator (or more) may also be provided, for example at or connected to at least one wheel 153, which may be configured to drive vehicle 150, recover braking energy, or both. These additional motor/generators may also provide additional driving wheels for low-traction conditions, for example, all-wheel drive or four-wheel drive. In embodiments where motor/generators are provided at more than one wheel 153, traction may be superior to conventional mechanical all-wheel drive or four-wheel drive systems because torque will be transmitted to one wheel even when the other wheel on the same axle has no traction at all (e.g., when the other wheel is not in contact with the ground).

Figure 3:
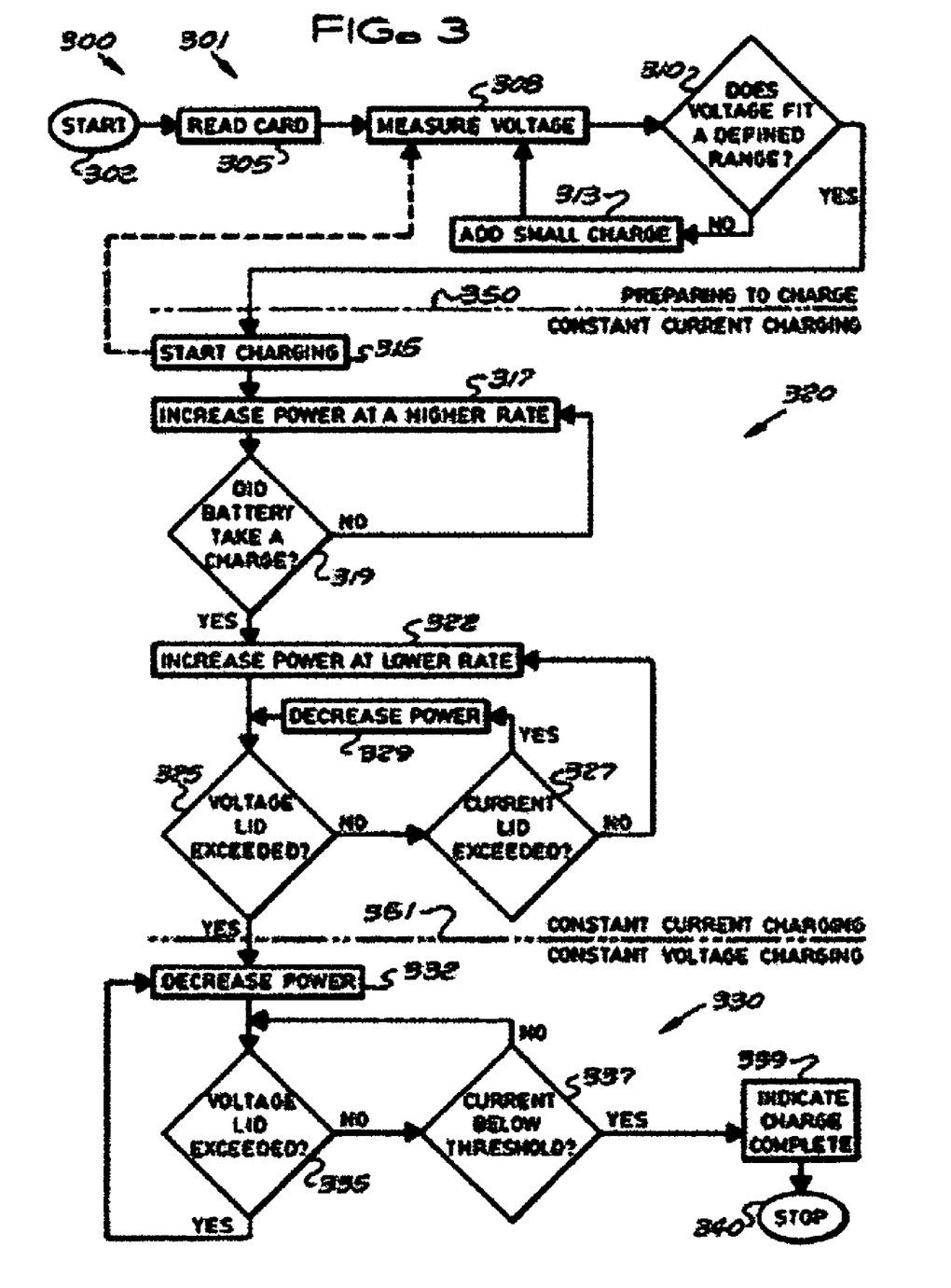
FIG. 3 is a flow chart illustrating a method of charging in accordance with the present invention.

A charger in accordance with the present invention may perform various steps in the process of charging a battery, for example, in a vehicle. For instance, FIG. 3 illustrates an exemplary embodiment of various steps included in the method 300 of the present invention, where stationary charger 100 is used to charge, for example, batteries 152 of vehicle 150. Method 300 is an exemplary embodiment of the present invention of charging at least one battery (e.g., 152). Controller 270 may perform many or all of these functions, and may include software configured to do so. On-board charger 160 may perform some or all of these steps, except as would be apparent to a person of skill in the art.

As an overview, method 300 may include various starting steps, and steps related to manipulation or control of the charging power level (e.g., of direct current 293). Many of the steps of method 300 involve controlling the charging power level, for example, by controlling power supply 240. In the exemplary embodiment illustrated in FIG. 3, method 300 includes three phases, preparing to charge (phase 301), constant current charging (phase 320), and constant voltage charging (phase 330). Preparing to charge (phase 301) includes the steps above line 350, constant current charging (phase 320) includes the steps between line 350 and line 351, and constant voltage charging (phase 330) includes the steps below line 351.

In these phases (for example 301, 320, and 330), the voltage and current of the output (e.g., of direct current 293) may be measured, for example with meter 295, and this information may be used (e.g., by controller 270) to control power supply 240. As will be described below, charger 100 or controller 270 may use this information to determine the type of battery or battery pack, determine what voltage or power level to start charging at, determine when and how quickly to change the charging rate, and when to stop charging and indicate that charging is complete.

Also as will be described in more detail below, charger 100 may start charging at a starting level (which may depend on the type of battery pack or battery), and may incrementally or gradually increase the charging level. Charger 100 may slow the rate of increase of the charging level once the battery starts to accept the charge, but may continue to increase the power level until a current lid is reached. Charger 100 may then maintain that same power level until the charging voltage for the particular type of battery (for example, from look-up table 272) is reached. Then charger 100 may gradually reduce the charging power level to maintain the same charging voltage (constant voltage charging, phase 330), until a reduction in charging current indicates that charging is complete.

Focusing now on the details of an exemplary embodiment of a method in accordance with the present invention, and referring to the specific steps illustrated in FIG. 3, in phase 301 of preparing to charge, charger 100 may activate or start (step 302) to function when a potential user activates or turns on charger 100. The potential user may do this, for example, by swiping a card through card reader 110 illustrated in FIGS. 1 and 2. In some embodiments, the user may start charger 100 (step 302), for example by pressing a button on charger 100 or connecting connector 126, and then swiping a card (for step 305). In any of these embodiments, card reader 110 may be configured to enable charger 100. As used herein, card reader 110 is said to be configured to enable charger 100, even if other conditions must exist or other actions must be taken to use charger 100.

Charger 100 may read the card (step 305), e.g., reading a credit card or account number. The card may be authorized, for example, or an account debited, as another example, via network 275 shown in FIG. 2. Controller 270's operation, or that of card reader 110, may be integrated with a credit card fueling system. For instance, operation may be initiated (step 305) by a 110-volt credit card reader authorization signal, and controller 270 may, for example, provide DC pulses from 0 to 1000 pulses per unit of energy back to the credit card reader/bank system (e.g., via network 275). In other embodiments, there may be no card reader 110 (and no step 305 of reading a card), and a user may start (step 302) charger 100 by pressing a button, for example, or connecting connector 126. In some embodiments, a user may enable charger 100 either by swiping a card or through another action.

In many embodiments, for safety reasons, charger 100 may be configured to refrain from starting (e.g., step 302) or to refrain from energizing the power conductors in connector 126, until one or more of the control pins in connector 126 is connected. Thus, when a battery or vehicle 150 is connected to charger 100, the safety pilot circuit may be completed enabling charger 100 or power supply 240 to start (e.g., in step 302). Charger 100 may indicate when connector 126 is connected, for example, via an LED or indicator light 108 or another display. The AC supply (e.g., input power 205) to charger 100 and/or to power supply 240 may turned "on" (e.g., in step 302) and the charger 100 may now be ready to proceed with the next step or begin charging. If a card system (e.g., card reader 110) is incorporated in charger 100, then the 110-volt AC initialization circuit may be completed by card reader 110 prior to commencement of battery charging. Disconnecting the connector 126 may break the safety circuit and charger 100 or power supply 240 may turn "off". In an exemplary embodiment, the safety pilot circuit may be in series with card reader 110 (of step 305).

Charger 100 may be configured to charge at a plurality of direct-current (e.g., direct current 293) output voltages, for example, for different types of batteries (e.g., battery 152) or different battery packs or numbers of batteries, for example, in series. In some embodiments, charger 100 may be configured to automatically determine the voltage of the battery or batteries (e.g., battery 152) and supply the correct output voltage (e.g., of direct current 293). Thus, charger 100 may need to determine what type of battery 152 charger 100 is connected to. Accordingly, the next step that charger 100 or controller 270 may perform may be to measure the voltage (step 308) of the battery or batteries (e.g., battery 152). For instance, charger 100 may measure the open circuit voltage of at least one battery 152.

In some embodiments, there may be more than one battery 152, for example, wired in series in a battery pack, and charger 100 may measure the voltage of some or all of the batteries 152, for example, added together. In some cases, there may be a small load or draw on the batteries (e.g., 152) while charger 100 is measuring the voltage (in step 308), such that this small load does not significantly reduce the voltage of the battery. As used herein, such a measurement is referred to as measuring the substantially open-circuit voltage of the battery. This measurement (step 308) may be performed by meter 295 illustrated in FIG. 2, and the measurement may be processed, for example, by controller 270.

Using the voltage (measured in step 308), charger 100 or controller 270 may then identify the type of battery pack or battery (e.g., 152) or nominal voltage of one or more batteries. The voltage measurement (from step 308) may be compared with common voltages (for example, nominal voltage) of battery packs or batteries, which information may be stored in look-up table 272. If the voltage measurement (from step 308) fits within a defined range of voltages of battery packs or batteries (as determined, for example, in decision step 310), then charger 100 may proceed to start charging (step 315) the battery or batteries (e.g., batteries 152).

The voltage, current, or power level at which charging is started (step 315) may depend on the type of battery pack or battery, as indicated by the voltage measured (in step 308). Therefore, the first power level may be selected based on the type of battery pack or battery (e.g., battery 152). As used herein, the "type of battery" may include the voltage which may be determined, for example, by the number of cells or the number of batteries connected or wired together, for example, in series. This first power level may be stored in look-up table 272, for example, sorted according to the type of battery 152. In the embodiment wherein power supply 240 is a variable-frequency generator, to start charging (step 315) controller 270 may set the frequency output of power supply 240 at a base frequency stored in look-up table 272. This base frequency may correspond to a particular starting voltage or power level. Thus, method 300 may include the step of, using the substantially open-circuit voltage (e.g., measured in step 308), selecting a first power level (e.g., for step 315) for charging at least one battery (e.g., 152), and the step of starting to charge (e.g., step 315) at least one battery (e.g., 152) at the first power level (e.g., of step 315).

As used herein, when a second parameter is said to be "based on" a first parameter, this means that the first parameter is used to determine what the second parameter is. For example, if the first parameter is a particular type of battery, or the measurement of a voltage, then the second parameter is "based on" the first parameter if the second parameter is obtained, for example, from look-up table 272 for data corresponding to the type of battery or batteries having that voltage.

If the voltage measured (in step 308) does not fall within a defined range (in step 310), for example, corresponding to a type of battery for which information is stored in look-up table 272, then charger 100 may prompt the user that charging has failed. In some embodiments, if the voltage measured (in step 308) is at or near zero, indicative of a completely drained or over discharged battery, then charger 100 may apply or add a small charge (step 313) to the battery or partially charge the battery (e.g., battery 152) or batteries. Thus, charger 100 may partially charge battery pack or battery 152 before the main charging process (e.g., phase 320 or 330) begins.

Charger 100 may apply this small charge to the battery by charging for a short period of time, for example. In one embodiment configured for charging electric or hybrid electric vehicles, for instance, this small charge (added in step 313) may be one ampere hour of energy. This may be enough to allow the battery pack or battery (e.g., 152) to produce an open-circuit voltage (measured in step 308) within the appropriate defined range (as determined in step 310) stored in look-up table 272. Charger 100 may then measure the voltage again (step 308) and determine whether it is within a defined range (step 310). If the voltage is still not within any of the ranges within look-up table 272, for example, another small charge may be applied (step 313), and this process may be continued until the voltage of battery pack or battery 152 is within a defined range. Hence, charger 100 may be able to gently recover or charge a dead or over-discharged battery pack or battery 152.

In some embodiments, the small charge may be added (step 313) only a certain number of times. If the voltage (of battery pack or battery 152, measured in step 308) is not within a defined range (step 310) after this certain number of times, charger 100 may stop charging and provide a fault indication (e.g., via screen 107 or indicator lights 108). For instance, charger 100 may provide a small charge (step 313) a maximum of three times.

In other embodiments, in the preparing to charge phase (phase 301), charger 100 or controller 270 may determine the type of battery pack or battery (e.g., battery 152) via digital or analog information, or a combination of both, provided through the control pins of connector 126. For example, control pins 5 and 6 may be used for this purpose. In such embodiments, it may not be necessary to measure the battery voltage (step 308) to determine the type of battery pack or battery, or battery voltage may be measured (in step 308) to confirm the type of battery pack or battery. Once battery voltage is determined, whether by measurement or other steps, the battery voltage may be displayed, for example, via an LED digital display or screen 107.

After charger 100 starts charging (e.g., in step 315), charger 100 may stop charging to verify that the type of battery pack or battery (e.g., identified in step 310) has been correctly identified. For example, charger 100 may charge at the starting power level (of step 315) for a few seconds to a number of minutes and then stop charging and measure the open-circuit voltage (step 308) of the battery or batteries again. If the voltage is again found to be within the same defined range (e.g., in step 310), then charger 100 may start charging (e.g., step 315) again, for example, at the same starting voltage, and may proceed to increase the charging power (e.g., step 317), as described below. On the other hand, if the open-circuit voltage is found to be within a different defined range (e.g., in step 310) than what was identified before, then charger 100 may start charging (e.g., step 315) again, but at the starting voltage for the newly defined battery pack or battery type, and may stop charging (e.g., in step 315) again to verify that the type of battery pack or battery (e.g., identified in step 310) has been correctly identified this time.

In other embodiments, charger 100 may stop charging at other points in the process (e.g., other steps of method 300) and check the open-circuit voltage to verify that the battery pack or battery is of the type identified or is within the identified defined range (e.g., in step 310). Thus, method 300 may include the steps of, stopping the charging (e.g., during step 315) and verifying the open-circuit voltage (e.g., by repeating step 308, and possibly step 310). In still other embodiments, charger 100 may check or monitor the voltage, charging current, or both of battery 152 while charging is taking place, to verify that the variables are within defined parameters. If they are not, charger 100 may stop charging, may provide an indication, and may measure the substantially open circuit voltage (step 308) again, and reevaluate (e.g., in step 310) whether the correct type battery pack or battery 152 has been identified.

Charger 100 may also (or instead) check the charging current to verify that the type of battery pack or battery (e.g., identified in step 310) has been correctly identified. For instance, charger 100 may measure the charging current (e.g., direct current 293), for example, while charging at the starting power level (e.g., of step 315). If the charging current is different than would be expected for the identified type of battery pack or battery at the starting power level (e.g., of step 315) then charger 100 may stop charging, measure the charging voltage (step 308) and reevaluate whether the battery pack or battery fits within the defined range previously identified (e.g., in step 310). Thus, method 300 may further include the steps of, using the substantially open-circuit voltage (e.g., from step 308), estimating a charging current (e.g., direct current 293) at a particular power level (e.g., the starting power level of step 315), and verifying that the charging current is within acceptable parameters at that particular power level. In other words, the current must be close enough to what was estimated that erroneous determination of the battery type or voltage (e.g., in step 310) is not reasonably suspected.

Charging may be started (step 315), at a rate of charging or first power level (e.g., of direct current 293) that is less than required or optimal to charge the particular type of battery. In some embodiments, the first power level may be less than is required to start charging the battery at all. But charger 100 may gradually increase the charging power (step 317), or power level of direct current 293, for example, at a first rate of increase. In the embodiment wherein power supply 240 is a variable voltage/variable frequency generator with a defined relationship between output voltage and output frequency, the frequency output of power supply 240 may be increased, for example, at a rate of 10 Hz per second.

While increasing the charging power (step 317), charger 100 may evaluate whether battery 152 is taking a charge. When battery 152 begins to take a charge, the voltage across battery 152 may stop increasing or level out, and the charging current (e.g., direct current 293) may start to flow or increase at a greater rate. Thus, charger 100 may evaluate whether battery 152 is taking a charge (step 319) by measuring the charging voltage and/or its rate of change, charging current and/or its rate of change. In other words, charger 100 or controller 270 may measure at least one of the charging voltage and the charging current, and do this instantaneously or over a period of time in order to make decisions about how to best continue charging the battery, or to end charging the battery. In one embodiment, controller 270 may increase the charging power (step 317) incrementally, measure the voltage, current, or both (e.g., of direct current 293 for step 319), and then modify the charging power supplied to the battery another increment (returning to step 317). The control process may occur so rapidly as to appear smooth rather than incremental. This process (steps 317 and 319) may be repeated until the voltage stops changing, for example. Or in another example, this process (steps 317 and 319) may be repeated until the current reaches a predetermined limit for the identified battery pack or battery (e.g., battery 152). The deciding parameter may be different for particular phases of the charging process, depending on the battery parameters, the state of charge, and other factors governing the charging process.

At first, the charging voltage may be increased, while the charging current (e.g., direct current 293) may remain essentially zero. But at some point as the charging voltage increases (step 317), the charging voltage exceeds the battery pack or battery (e.g., battery 152) voltage and the charging current (e.g., direct current 293) may start to flow and proceed to increase. At this point the charging current (e.g., direct current 293) may start to charge the battery pack or battery (e.g., battery 152). When the charging current (e.g., direct current 293) starts to flow, the voltage (e.g., the voltage across battery pack or battery 152) may level off. This may be seen as a reduction in the rate of change of the voltage as the power level continues to increase. This reduction in the rate of change of the voltage may be substantial.

At this point (decision step 319), charger 100 may change or reduce the rate of increase of the charging power level (e.g., of direct current 293), for example, to a second rate of increase (step 322). Thus, the first rate of increase (of step 317) may be a higher rate of increase, and the second rate of increase (step 322) may be a lower rate of increase. Thus, method 300 may have at least a first rate of increase (of charging power level, step 317) and a second rate of increase (of charging power level, step 322), and the first rate of increase may occur (in time) before the second rate of increase. In addition, the first rate of increase (step 317) may be greater (a greater rate of increase) than the second rate of increase (step 322). The second rate of (power) increase (of step 322) may be, for example, about half as great as the first (higher) rate of (power) increase (of step 317).

In the embodiment wherein power supply 240 is a variable-frequency generator, the dependent voltage based on frequency output of power supply 240 may be increased, for example, at a second (lower) rate (of step 322) of 5 Hz per second. Thus, the step of changing or increasing the charging power level (e.g., step 317 or 322) may include changing or increasing a frequency relating to a voltage.

Reducing the rate of increase of voltage to increase the power level (decision step 319 and step 322) may occur either when the charging voltage (e.g., measured by meter 295) substantially stops increasing, or the charging current (e.g., direct current 293) starts flowing. In some embodiments, controller 270 may reduce the rate of increase of the power level when either the charging voltage substantially stops increasing, or the charging current starts flowing, for example exceeding a minimum value. In other embodiments, controller 270 may reduce the rate of increase of the power level only when both the charging voltage substantially stops increasing, and the charging current starts flowing. Thus, In various embodiments, either the charging voltage or the charging current (or both) may be used to determine (step 319) when to reduce the rate of increase of charging power. Thus, the change from the first rate of increase (e.g., step 317) to the second rate of increase (e.g., step 322) may be triggered (e.g., in step 319) by at least one of: a substantial cessation of increasing of the charging voltage, and the charging current (e.g., direct current 293) exceeding a minimum value. That minimum value may be, for example, at or near zero, or substantially less than the current lid (e.g., of step 327).

In some embodiments, charger 100 may alarm or stop charging if an increase in the charging current or a decrease in the rate of increase in voltage do not occur within a particular tolerance of the characteristics of the type of battery pack or battery 152 identified (in step 310). Similarly, in some embodiments, charger 100 may alarm or stop charging if an increase in the charging current or a decrease in the rate of increase in voltage occurs outside of a particular tolerance of the characteristics of the type of battery pack or battery 152 identified (in step 310). Power level may be used in lieu of current or in lieu of voltage. Thus, in some embodiments, charger 100 may determine (in step 319) whether, for example, the current (e.g., direct current 293) fits a defined range for the selected voltage at the specific current or power setting.

It should be noted that in the embodiment illustrated in FIG. 3, there are two rates of increase of power (or rates of increase of frequency in embodiments wherein power supply 240 is a variable-frequency generator), namely, steps 317 and 322. In other embodiments there may be only one rate of increase of power (or rate of increase of frequency), for example, 5 Hz per second. In still other embodiments, there may be more than two rates of increase of power (or rates of increase of frequency), or the rate may be changed gradually or be completely variable. For example, the rate of increase of power (or rate of increase of frequency) may start (e.g., at step 315 or 317) at a higher level, and may decrease gradually, for example, as the current lid (e.g., of step 325) is approached. Charger 100 or controller 270 may continuously monitor charging voltage, charging current, or both (e.g., of direct current 293) and use this information to adjust the rate of increase of power, voltage or current (or rate of increase of frequency), or to reevaluate whether charger 100 is connected and operating properly and whether the type of battery identified (e.g., in step 310) is correct.

Charger 100 may continue increasing the power level (step 322) at the second or lower rate of increase, while measuring the charging voltage (decision step 325). In some embodiments, charger 100 may increase the power level (step 322) incrementally, then measure the charging voltage (step 325), and repeat this process (steps 322 and 325). When the charging voltage reaches the voltage lid (as determined in step 325), method 300 may advance to constant voltage charging (phase 330).

The voltage lid (for example, of step 325) may be the maximum voltage at which the battery or batteries (e.g., 152) can safely be charged at the rate they are receiving charge. The voltage lid may be, for instance, the charging voltage of the type of battery cell, times the number of cells arranged or wired in series. The voltage lid may be stored in look-up table 272, for example, for the particular type battery pack or battery (for example, as identified in step 310). The voltage lid may vary with the temperature. Charger 100 or controller 270 may input the temperature of the battery pack or battery (e.g., of battery 152 via control pins in connector 126) and use that information to adjust the voltage lid. In some embodiments, where precise battery temperature is not available, charger 100 or controller 270 may use the ambient temperature to adjust the voltage lid. Thus, the voltage lid (of step 325) may be corrected for temperature or temperature corrected. In other words, the voltage lid (e.g., of step 325 or 335) may be adjusted for the temperature of the battery (e.g., 152). The voltage lid may also be corrected for the charging rate or the power level of the charge being delivered.

If the voltage lid has not been exceeded (e.g., in step 325) then charger 100 may measure the charging current to determine whether a current lid has been reached or exceeded (step 327). Thus, method 300 may include the step of increasing the charging power level (e.g., in step 322) until at least one of a current lid (e.g., of step 327) and a voltage lid (e.g., of step 325) is exceeded. In the embodiment wherein power supply 240 is a variable-frequency generator, for example, method 300 may include the step of increasing the charging power level (e.g., in step 322) and a frequency dependent voltage (e.g., of alternating current 241, also increased in step 322, for example) until at least one of a current lid (e.g., of step 327) and a voltage lid (e.g., of step 325) is exceeded (e.g., by direct current 293). In addition, in some embodiments, the variable-frequency generator may have an alternating current output (e.g., alternating current 241), which may be transformed with a foil-type transformer (e.g., transformer 280).

In the particular embodiment illustrated, if the current lid is exceeded (e.g., in step 327) before the voltage lid is exceeded (e.g., in step 325), then the step of increasing the charging power level (e.g., in step 322) occurs until a current lid is exceeded (e.g., in step 327). It should be noted that, the current lid (e.g., of step 327) and the voltage lid (e.g., of step 325) may be specific points within a range, above or below which points different actions may be taken. Thus, as used herein, the word "exceeded", when referring to a current or voltage lid, shall include embodiments wherein actions are taken when the points are merely reached. In other words, as used herein, "exceeded" includes being reached.

The charging current (e.g., direct current 293) may be measured with meter 295, for example, by measuring the voltage across a shunt. The charging current and charging voltage, or voltage across the battery, may be measured by meter 295 illustrated in FIG. 2, and controller 270 may process these measurements and control power supply 240. The current lid (of step 327) may depend on the particular type of battery pack or battery (e.g., battery 152) as determined in step 310. Thus, the voltage lid (e.g., of step 325) may be based on the open-circuit voltage (e.g., measured in step 308).

In some embodiments, the current lid (of step 327) may be selected based on the type of battery pack or battery (e.g., battery 152) and may be stored in look-up table 272. In other embodiments, (or for some types of battery packs or batteries), the current lid (of step 327) may be the current capacity of charger 100, for example, current in the range of about 30 amps to about 300 amps. In embodiments wherein the current lid (of step 327) is the current capacity of the charger, the battery pack or battery (e.g., 152) may be protected from being charged too rapidly by the voltage lid (e.g., of step 325). Once the current lid is reached (as determined in step 327), charger 100 may stop increasing the charging power level, or may decrease the charging power level (step 329), for example, incrementally.

Charger 100 or controller 270 may repeatedly check the charging voltage (step 325) and current (step 327) and either increase (step 322) or decrease (step 329) the power level to keep the charging current (e.g., direct current 293) substantially at the current lid. This loop (steps, 325, 327, and alternately 322 or 329) provides essentially constant current charging (phase 320). Thus, method 300 may include charging at a substantially constant current until the voltage lid (e.g., of step 325) is exceeded. In the exemplary embodiment illustrated, during phase 320, the power level (e.g., of power supply 240) will gradually increase as the charging voltage increases. In the embodiment wherein power supply 240 is a variable-frequency generator, the frequency output of power supply 240 may gradually increase accordingly.

In the embodiment illustrated in FIG. 3, during constant current charging, alternating between increasing the power level (step 322) and decreasing the power level (step 329) causes the charging voltage and current to oscillate to some extent. This may facilitate cooling of battery 152 which may allow battery 152 to be charged more quickly, all other things being equal. But some embodiments of the present invention may not have this feature.

In another exemplary embodiment, once the current lid is reached, the power level of charger 100 or power supply 240 may be held constant or gradually increased until the voltage lid is reached or exceeded. In the embodiment wherein power supply 240 is a variable-frequency generator, the frequency output of power supply 240 may be held constant or gradually increase after the current lid is reached, for example.

While charging or continuing to charge at the same current (e.g., direct current 293) (phase 320), charger 100 or controller 270 may continue to measure the charging voltage (step 325). The charging voltage will generally increase as the battery charges, and eventually the voltage lid (of step 325) will be reached. Then, as mentioned above, method 300 begins constant voltage charging (phase 330). In some cases, for example, for small or relatively low capacity battery packs or batteries (e.g., batteries 152), or batteries that are already substantially charged, method 300 may never enter the phase of constant current charging (phase 320). Rather, the voltage lid may be exceeded (step 325) before the current lid is exceeded (step 327).

Whether constant current charging (phase 320) has occurred or not, when method 300 enters the phase of constant voltage charging (phase 330), the charging power will be decreased (step 332), for example, incrementally or smoothly. If the charging voltage remains above the voltage lid (e.g., in step 335) then the charging voltage will be reduced further (repeating step 332) until the charging voltage does not exceed the voltage lid (in step 335). Then charger 100 or controller 270 may monitor whether the charging current has dipped below a current threshold (step 337). This current threshold may be stored in look-up table 272 for the particular type battery pack or battery (e.g., battery 152, as identified in step 310). In other words, the threshold may be selected (e.g., by controller 270) based on the type of battery pack or battery (e.g., battery 152) or based on the open-circuit voltage (e.g., measured in step 308).

This loop or process of comparing the charging voltage with the voltage lid (step 335) and comparing the charging current with the current threshold (step 337) may continue, occasionally or gradually decreasing the power level (step 332) as the battery fills and the rate of charge (e.g., direct current 293) decreases until the charging current drops below the threshold (step 337). Thus, method 300 may include the step of charging until a current threshold is reached (e.g., in step 337). In addition, since the charging voltage may tend to increase as the battery is charged, and the power level may be decreased (e.g., e.g., in phase 330, for example, in step 332) if the voltage lid is exceeded (e.g., in step 335), the step of charging until a current threshold is reached (e.g., in step 337)

may be at a substantially constant voltage. This substantially constant voltage (e.g., of phase 330) may be, for example, the voltage lid (e.g., of step 335). Thus, method 300 may include (e.g., in phase 330) the step of charging substantially at the voltage lid.

The voltage, current, or power level at which charging is taking place (e.g., in steps 315 through 339) may be indicated, for example, in real time, via an LED or screen 107. When the charging current (e.g., direct current 293) drops below the threshold (as determined in step 337), charger 100 may stop charging (step 340), may indicate that charging is complete (step 339, e.g., via indicator lights 108, screen 107, or both), or both. Thus, charger 100 may be configured to enable an indication when the battery pack or battery (e.g., battery 152) is substantially charged. And method 300 may include the step of stopping charging (step 340) when the charging current (e.g., direct current 293) reaches (or becomes less than) the current threshold (e.g., in step 337). As used herein, the term "reaches", when referring to the current threshold, includes becoming less than the threshold.

The voltage, current or power level at which charging is taking place may be controlled in such a way that once a particular limit has been reached, it cannot be exceeded, and can only be decremented from, even as other limits are allowed to increase with the battery state of charge. In one instance, for example, power and voltage may be allowed to increase after the current limit is reached, but current may not be allowed to increase and may only decrement to a new (lower) current limit, which may only be decremented from further still until a minimum current may be reached for a particular system. In another example, power and current may be increased while the battery voltage is held substantially constant. Further, in some situations, a specific parameter may increase or decrease in a way that indicates charging may be terminated, for instance when a constant power and a decreasing voltage result in an increasing charging current to the battery.

Charger 100 may be used for fast or opportunity charging, in which case the current threshold (e.g., of step 337) may be more than what would correspond to a full battery charge for the particular type battery, or more than an optimal charge where time is not a consideration. In some embodiments, fast or opportunity charging may take place for a particular amount of time or energy, for example, entered by the user into key pad 104. In some embodiments, when a certain amount of charging has been completed or the charge of battery 152 reaches a certain level, charger 100 may indicate that charging is complete (step 339) or substantially complete. But charger 100 may continue to charge battery 152 until a current threshold is reached unless the user disconnects or stops (step 340) charger 100. For instance, charger 100 may indicate that charging is complete at one current threshold (step 337) and stop charging at a lower current threshold (similar to step 337). This feature may facilitate minimizing the charging time if the user is waiting for the charge to be completed, but maximizing the amount of charging that takes place if the user is not ready to use, for example, vehicle 150. There may also be benefits to battery 152 of giving it a deeper charge periodically. The user may be given the option of whether to select this feature, for example, so that the user can decline this feature if the amount of money the user wants to pay for the charge is the limiting factor rather than time.

When charger 100 indicates that charging is complete (step 339), or the user stops or disconnects charger 100, charger 100 may provide information to the user, such as the amount of charge that was made, the price charged, etc., for example, via screen 107. A receipt may be printed, for example, via printer 111.

While charging is taking place (e.g., steps 313 through 339), controller 270 or a signal generator may provide a signal to card reader 110 or network 275 indicating the amount of energy used or the price charged for the charging energy provided thus far. As an example, up to 1000 pulses may be provided per unit of energy.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used in this document, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described in this document is required for the practice of the invention unless expressly described as "essential" or "critical".

In addition, modifications may be made to the disclosed embodiments without departing from the scope of the invention. The scope of the invention is therefore not limited to the disclosed embodiments but is defined by the appended claims. In other words, other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention. It is contemplated that the use of the present invention can involve components having different characteristics as long as the elements of at least one of the claims below, or the equivalents thereof, are included.

What is claimed is:

1. A battery charger comprising:
   a direct current (DC) power supply;
   a variable alternating-current power supply configured to receive direct current from said DC power supply and output a first alternating current of a controllable power level superimposed upon at least one of a higher frequency switched frequency and a higher frequency carrier frequency; and
   a controller configured to control said variable alternating-current power supply, said controller including control of at least said power level of said first alternating current.

2. A battery charger, comprising:
   an alternating-current (AC) power supply;
   a device configured to receive a first alternating current from said AC power supply and convert said first alternating current to a direct-current (DC) output;
   a variable alternating-current power supply configured to receive said DC output from said device and output a second alternating current of a controllable power level superimposed upon at least one of a higher frequency switched frequency and a higher frequency carrier frequency; and
   a controller configured to control said variable alternating-current power supply, said controller including control of said power level of said second alternating current.

3. The battery charger of claim 2, further comprising:
a first transformer configured to receive said first alternating current and change a voltage of said first alternating current, and transmit said first alternating current to said device.

4. The battery charger of claim 3, wherein said first transformer is at least one of a wire wound transformer and a foil transformer.

5. The battery charger of claim 3, wherein said first transformer is c configured to at least one of modify and change said voltage, and at least one of modify and change amperage of said first alternating current.

6. The battery charger of claim 3, wherein said first transformer is c configured to change said voltage to a voltage in the range of about 30 volts to a about 700 volts, and increase amperage of said first alternating current to a c current in the range of about 30 amps to about 300 amps.

7. The battery charger of claim 3, further comprising:
a second transformer configured to supply power to said controller.

8. The battery charger of claim 2, wherein said controller is one of a digital controller, an analog controller, and a digital/analog controller.

9. The battery charger of claim 2, further comprising:
a filter configured to filter said direct-current output, said filter comprising at least one of an inductor and a capacitor, wherein said filter achieves optimization utilizing a carrier of said switched frequency and an output frequency of said power supply.

10. The battery charger of claim 2, wherein said controller is configured to measure the voltage of said direct-current output.

11. The battery charger of claim 2, wherein the charger is configured to communicate with a diagnostic device configured to facilitate maintenance or diagnosis of faults.

12. The battery charger of claim 2, wherein said first transformer is configured so that said second alternating current has a lower voltage and a higher amperage than said first alternating current; and said variable-frequency generator being configured so that said first alternating current has a substantially higher frequency than that of said input electrical power.

13. An electric-vehicle charger comprising:
a variable-frequency generator configured to input electrical power and output a first alternating current of a controllable frequency superimposed upon at least one of a higher frequency switched frequency and a higher frequency carrier frequency;
a controller configured to control said variable-frequency generator, the controller including control of the frequency of said first alternating current;
a first transformer configured to change the voltage of said first alternating current to a second alternating current;
a device configured to convert said second alternating current to a direct-current output; and
a connector configured to connect to an electric vehicle and deliver said direct-current output to the vehicle.

14. The electric-vehicle charger of claim 3, wherein said first transformer is configured to receive said first alternating current, change a voltage of said first alternating current to form said second alternating current, and transmit said second alternating current to said device.

15. The electric-vehicle charger of claim 13, wherein said first transformer is at least one of a wire wound transformer and a foil transformer.

16. The electric-vehicle charger of claim 13, said charger being configured to charge at a plurality of direct-current output voltages, the charger being configured to automatically determine the voltage of the electric vehicle and supply the correct voltage and current.

17. The electric-vehicle charger of claim 13, wherein the charger is configured to charge in the range of about 30 amps to about 300 amps.

18. The electric-vehicle charger of claim 13, wherein the charger is configured to charge in the range of about 12 volts to about 700 volts.

19. The electric-vehicle charger of claim 13, further comprising:
a second transformer configured to supply power to said controller.

20. The electric-vehicle charger of claim 13, further comprising:
a card reader configured to enable the charger.

21. The electric-vehicle charger of claim 13, further comprising:
a filter configured to filter said direct-current output, said filter comprising at least one of an inductor and a capacitor, wherein said filter achieves optimization utilizing a carrier of said switched frequency and an output frequency of said power supply.

22. The electric-vehicle charger of claim 13, wherein said controller is configured to measure the voltage of said direct-current output.

23. The electric-vehicle charger of claim 13, wherein said controller is configured to enable an indication when the electric vehicle is substantially charged.

24. The electric-vehicle charger of claim 13, wherein the charger is configured to communicate with a diagnostic device configured to facilitate maintenance or diagnosis of faults.

25. The electric-vehicle charger of claim 13, wherein said first transformer is configured so that said second alternating current has a lower voltage and a higher amperage than said first alternating current; and said variable-frequency generator being configured so that said first alternating current has a substantially higher frequency than that of said input electrical power.

* * * * *

UNITED STATES PATENT AND TRADEMARK OFFICE
CERTIFICATE OF CORRECTION

PATENT NO. : 7,411,371 B2  Page 1 of 1
APPLICATION NO. : 11/162107
DATED : August 12, 2008
INVENTOR(S) : Raymond Hobbs It is certified that error appears in the above-identified patent and that said Letters Patent is hereby corrected as shown below:

Claim 5, line 2, delete "c" before "configured";

Claim 6, line 2, delete "c" before "configured";

Claim 14, line 1, "claim 3" should read -- claim 13 --.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,411,371 B2  Page 1 of 1
APPLICATION NO. : 11/162107
DATED : August 12, 2008
INVENTOR(S) : Raymond Hobbs It is certified that error appears in the above-identified patent and that said Letters Patent is hereby corrected as shown below:

Column 25, Claim 5, line 9, delete "c" before "configured";

Column 25, Claim 6, line 14, delete "c" before "configured";

Column 26, Claim 14, line 3, "claim 3" should read -- claim 13 --.

This certificate supersedes the Certificate of Correction issued October 7, 2008.

Signed and Sealed this

Twenty-first Day of October, 2008

JON W. DUDAS
*Director of the United States Patent and Trademark Office*